(12) United States Patent
Biskeborn et al.

(10) Patent No.: US 8,427,780 B2
(45) Date of Patent: Apr. 23, 2013

(54) PLANAR MAGNETIC WRITER HAVING OFFSET PORTIONS

(75) Inventors: Robert Glenn Biskeborn, Hollister, CA (US); Lubomyr T. Romankiw, Briancliff Manor, NY (US); Steven Erik Steen, Peekskill, NY (US); Bucknell Chapman Webb, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 767 days.

(21) Appl. No.: 12/358,503

(22) Filed: Jan. 23, 2009

(65) Prior Publication Data
US 2010/0188774 A1 Jul. 29, 2010

(51) Int. Cl.
*G11B 5/17* (2006.01)
(52) U.S. Cl.
USPC ............ 360/123.01; 360/125.54; G9B/5.05
(58) Field of Classification Search .................. None
See application file for complete search history.

(56) References Cited

U.S. PATENT DOCUMENTS

| | | | | |
|---|---|---|---|---|
| 4,012,783 A * | 3/1977 | Hanaoka | ................ | 360/125.01 |
| 4,956,737 A * | 9/1990 | Brock | ...................... | 360/122 |
| RE33,383 E | 10/1990 | Lazzari | ...................... | 156/643 |
| 5,764,448 A | 6/1998 | Lazzari et al. | ................ | 360/113 |
| 5,863,450 A | 1/1999 | Dutertre et al. | ................ | 216/27 |
| 6,500,498 B1 * | 12/2002 | Ford et al. | ...................... | 427/531 |
| 6,542,325 B1 * | 4/2003 | Molstad et al. | ............ | 360/77.12 |
| 6,970,323 B2 * | 11/2005 | Kamijima | ............... | 360/123.39 |
| 7,193,814 B2 | 3/2007 | Han et al. | ...................... | 360/126 |
| 7,253,990 B2 | 8/2007 | Takano | ........................ | 360/126 |
| 7,327,532 B2 | 2/2008 | Takano et al. | ................ | 360/125 |
| 2006/0044677 A1 | 3/2006 | Li et al. | | |
| 2009/0316290 A1 | 12/2009 | Biskeborn et al. | | |
| 2009/0316291 A1 | 12/2009 | Biskeborn et al. | | |

* cited by examiner

*Primary Examiner* — Hoai V Ho
*Assistant Examiner* — James G Norman
(74) *Attorney, Agent, or Firm* — Zilka-Kotab, PC

(57) ABSTRACT

A magnetic head in one embodiment includes a bottom pole; a top pole positioned above a plane extending through the bottom pole and parallel to a plane of deposition of the bottom pole, wherein the top pole is at least partially offset from the bottom pole in a direction parallel to a plane of deposition of the top pole; a first write gap in the top pole; and a first coil for generating a magnetic flux across the first write gap. A method in one embodiment includes forming a bottom pole; forming a top pole above a plane extending through the bottom pole and parallel to a plane of deposition of the bottom pole, wherein the top pole is at least partially offset from the bottom pole in a direction parallel to a plane of deposition of the top pole, wherein at least one write gap is formed in the top pole; forming side poles for coupling the top and bottom poles; and forming a first coil for generating a magnetic flux across the first write gap.

20 Claims, 7 Drawing Sheets

PLANAR MAGNETIC WRITER HAVING OFFSET PORTIONS

BACKGROUND

The present invention relates to data storage systems, and more particularly, this invention relates to planar magnetic write heads.

In magnetic storage systems, data is read from and written onto magnetic recording media utilizing magnetic transducers commonly. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track density on recording tape, and decreasing the thickness of the magnetic tape medium. However, the development of small footprint, higher performance tape drive systems has created various problems in the design of a tape head assembly for use in such systems.

SUMMARY

A magnetic head in one embodiment includes a bottom pole; a top pole positioned above a plane extending through the bottom pole and parallel to a plane of deposition of the bottom pole, wherein the top pole is at least partially offset from the bottom pole in a direction parallel to a plane of deposition of the top pole; a first write gap in the top pole; and a first coil for generating a magnetic flux across the first write gap.

A magnetic head in another embodiment includes a bottom pole; a top pole positioned above a plane extending through the bottom pole and parallel to a plane of deposition of the bottom pole, wherein the top pole is at least partially offset from the bottom pole in a direction parallel to a plane of deposition of the top pole; a first write gap in the top pole; a second write gap in the top pole; and a first coil for generating a magnetic flux across the first and second write gaps, wherein the first and second write gaps are oriented at an angle relative to each other selected from a range of 0 degrees to less than 180 degrees.

A method in one embodiment includes forming a bottom pole; forming a top pole above a plane extending through the bottom pole and parallel to a plane of deposition of the bottom pole, wherein the top pole is at least partially offset from the bottom pole in a direction parallel to a plane of deposition of the top pole, wherein at least one write gap is formed in the top pole; forming side poles for coupling the top and bottom poles, and forming a first coil for generating a magnetic flux across the first write gap.

Any of these embodiments may be implemented in a magnetic data storage system such as a tape drive system, which may include a magnetic head as recited above, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of tape-based storage systems, as well as operation and/or component parts thereof.

In one general embodiment, a magnetic head in includes a bottom pole; a top pole positioned above a plane extending through the bottom pole and parallel to a plane of deposition of the bottom pole, wherein the top pole is at least partially offset from the bottom pole in a direction parallel to a plane of deposition of the top pole; a first write gap in the top pole; and a first coil for generating a magnetic flux across the first write gap.

In another general embodiment, a magnetic head includes a bottom pole; a top pole positioned above a plane extending through the bottom pole and parallel to a plane of deposition of the bottom pole, wherein the top pole is at least partially offset from the bottom pole in a direction parallel to a plane of deposition of the top pole; a first write gap in the top pole; a second write gap in the top pole; and a first coil for generating a magnetic flux across the first and second write gaps, wherein the first and second write gaps are oriented at an angle relative to each other selected from a range of 0 degrees to less than 180 degrees.

In one general embodiment, a method includes forming a bottom pole; forming a top pole above a plane extending through the bottom pole and parallel to a plane of deposition of the bottom pole, wherein the top pole is at least partially offset from the bottom pole in a direction parallel to a plane of deposition of the top pole, wherein at least one write gap is formed in the top pole; forming side poles for coupling the top and bottom poles; and forming a first coil for generating a magnetic flux across the first write gap.

Figure 1:
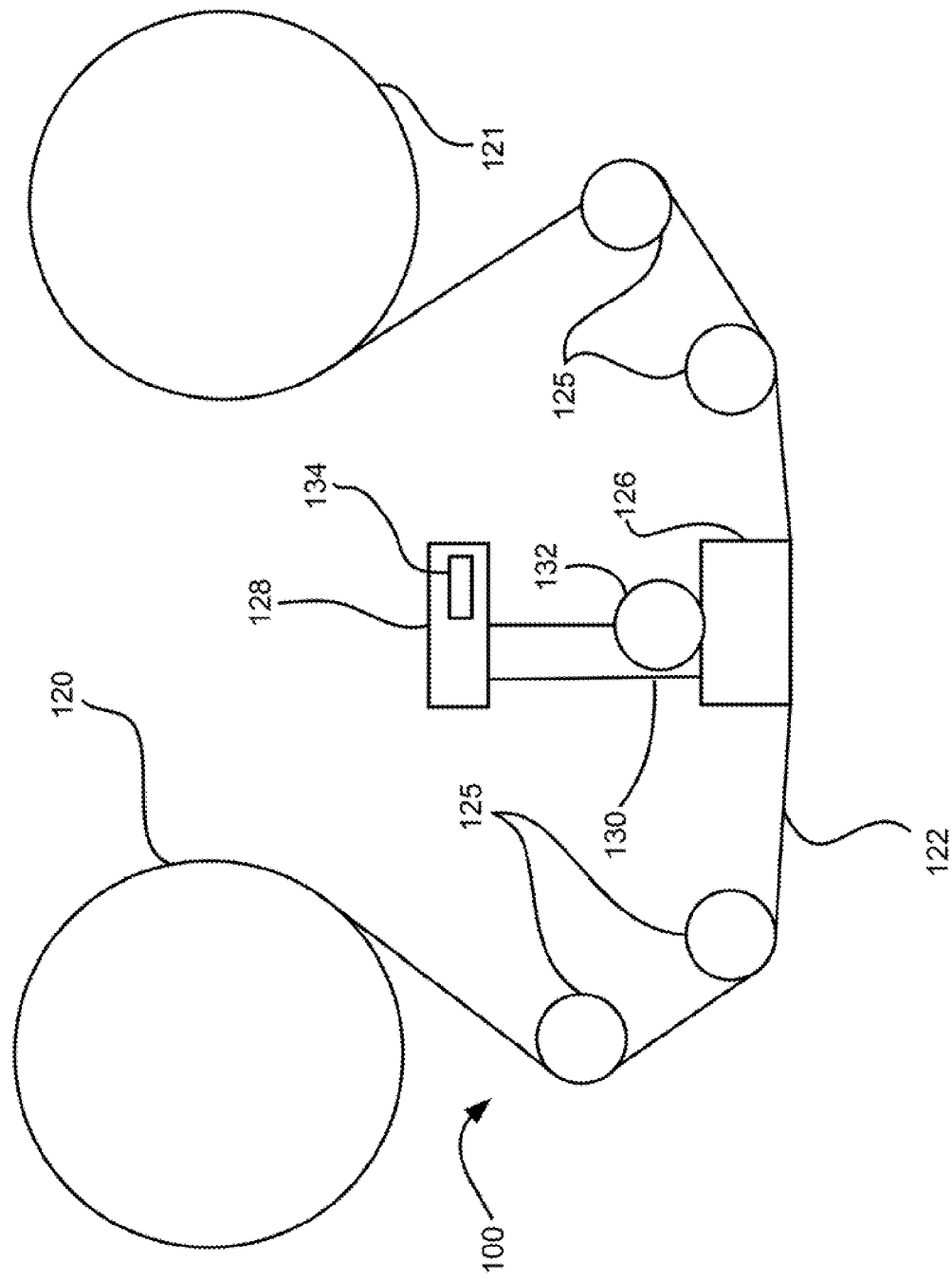
FIG. 1 is a schematic diagram of a simplified tape drive system according to one embodiment.

FIG. 1 illustrates a simplified tape drive 100 of a tape-based data storage system, which may be employed in the context of the present invention. While one specific implementation of a tape drive is shown in FIG. 1, it should be noted that the embodiments described herein may be implemented in the context of any type of tape drive system.

As shown, a tape supply cartridge 120 and a take-up reel 121 are provided to support a tape 122. One or more of the reels may form part of a removable cassette and are not necessarily part of the system 100. The tape drive, such as that illustrated in FIG. 1, may further include drive motor(s) to drive the tape supply cartridge 120 and the take-up reel 121 to move the tape 122 over a tape head 126 of any type.

Guides 125 guide the tape 122 across the tape head 126. Such tape head 126 is in turn coupled to a controller assembly 128 via a cable 130. The controller 128 typically controls head functions such as servo following, writing, reading, etc. The cable 130 may include read/write circuits to transmit data to the head 126 to be recorded on the tape 122 and to receive data read by the head 126 from the tape 122. An actuator 132 controls position of the head 126 relative to the tape 122.

An interface may also be provided for communication between the tape drive and a host (integral or external) to send and receive the data and for controlling the operation of the tape drive and communicating the status of the tape drive to the host, all as will be understood by those of skill in the art.

Figure 2:
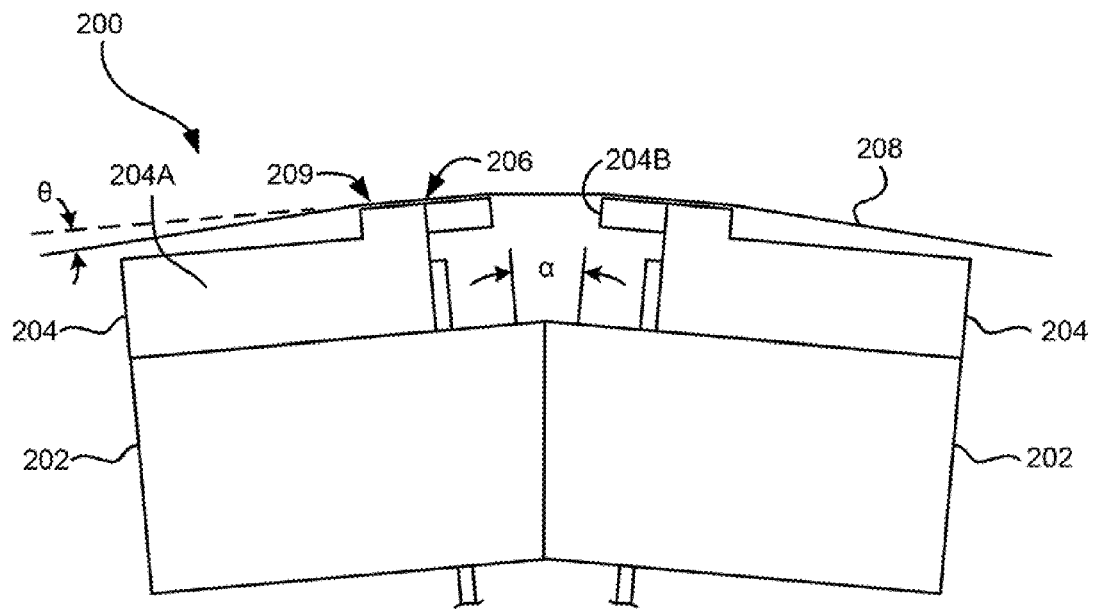
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle u with respect to each other. The bases are typically "U-beams" that are adhesively coupled together. Each module 204 includes a substrate 204A and a closure 204B with a gap 206 comprising readers and/or writers situated therebetween. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between ⅛ degree and 4½ degrees.

The substrates 204A are typically constructed of a wear resistant material, such as a ceramic. The closures 204B made of the same or similar ceramic as the substrates 204A.

The readers and writers may be arranged in a piggyback configuration. The readers and writers may also be arranged in an interleaved configuration. Alternatively, each array of channels may be readers or writers only. Other configurations are also possible. Any of these arrays may contain one or more servo readers.

Figure 3:
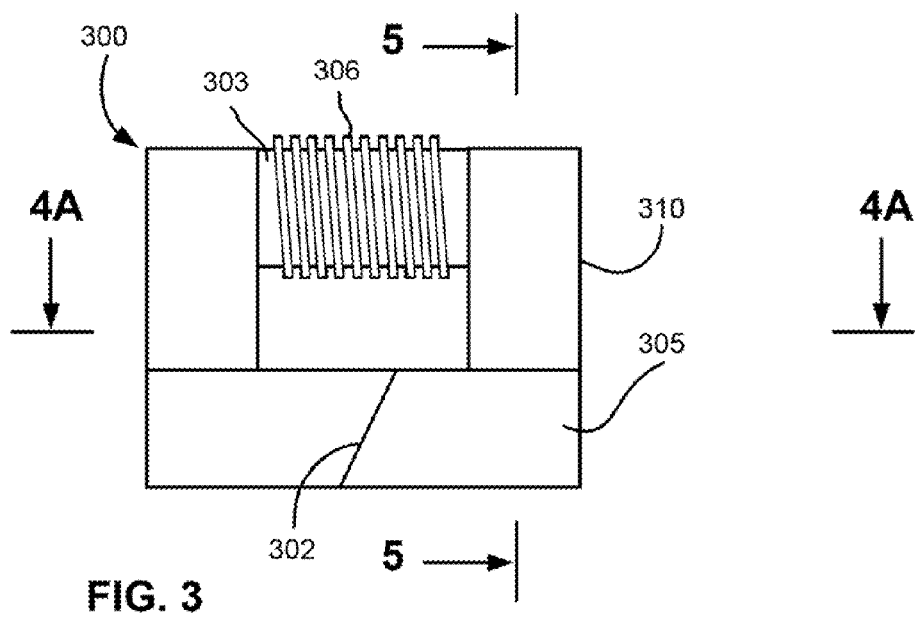
FIG. 3 is a partial tape bearing surface of a head according to one embodiment.
Figure 4A:
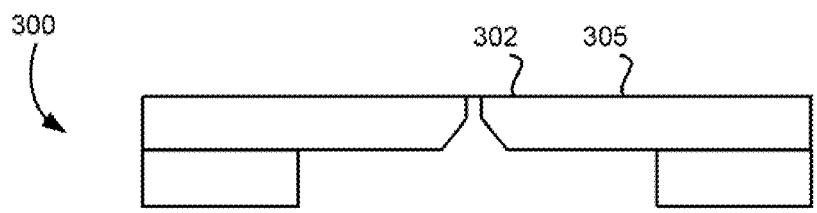
FIG. 4A is a cross sectional view of FIG. 3 taken along Line 4A-4A of FIG. 3.

FIG. 3 illustrates a head 300 according to one embodiment. FIG. 4A shows a cross section of FIG. 3 taken along Line 4A-4A. FIG. 5 shows a cross section of FIG. 3 taken along Line 5-5. As shown in FIGS. 3-5, the head 300 has a top pole 305 with a first write gap 302 therein. The top pole is positioned above a plane extending through the bottom pole 303 and parallel to a plane of deposition of the bottom pole. Side poles 310 connect the top and bottom poles. As best seen in FIG. 5, the top pole is at least partially offset from the bottom pole in a direction parallel to a plane of deposition of the top pole. In one approach, a portion of the top pole does not overlie the bottom pole. In another approach, parallel, central longitudinal axes of tile top and bottom poles are offset from one another in a direction parallel to a plane of deposition of the top pole.

The top pole may partially overlie the bottom pole. However, in particularly preferred embodiments, the top pole is completely offset from the bottom pole such that the top pole does not overlie the bottom pole. See, e.g., FIG. 5.

The top pole may be constructed of a high moment material such as NiFe alloys, including 45/55 NiFe, or other high moment materials. Illustrative dimensions of the top pole are between about 0.5 microns and about 2 microns, but could be higher or lower. The top pole may be tapered or shaped as in FIG. 4A, 11C, etc. to focus the flux at the gap.

The bottom pole and side poles can be a high permeability material such as permalloy, CZT, etc. The bottom pole may have a lower magnetic moment than the top pole, in which case it would be preferably made wider and/or thicker than the top pole. The same applies to the side poles. The amount of open space created by the offset between the top and bottom poles may be tailored to maximize the head efficiency.

A first coil 306 generates a magnetic flux across the first write cap, thereby causing a magnetic flux to emanate from the first gap.

Figure 4B:
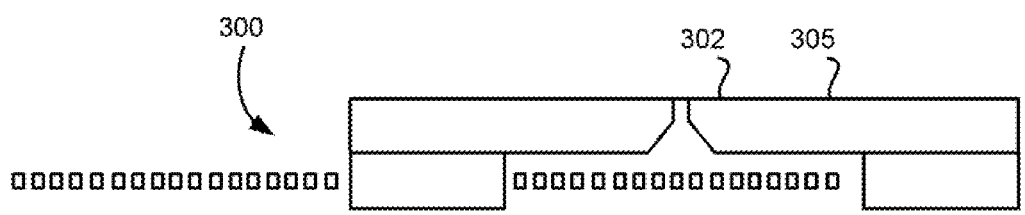
FIG. 4B shows an alternate embodiment having a pancake coil.
Figure 5:
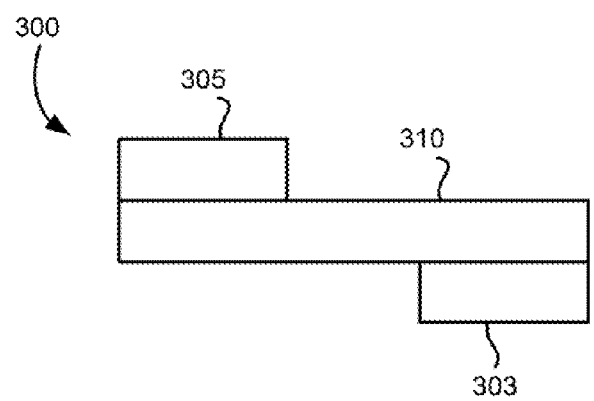
FIG. 5 is a cross sectional view of FIG. 3 taken along Line 5-5 of FIG. 3.
Figures 10A, 10B:
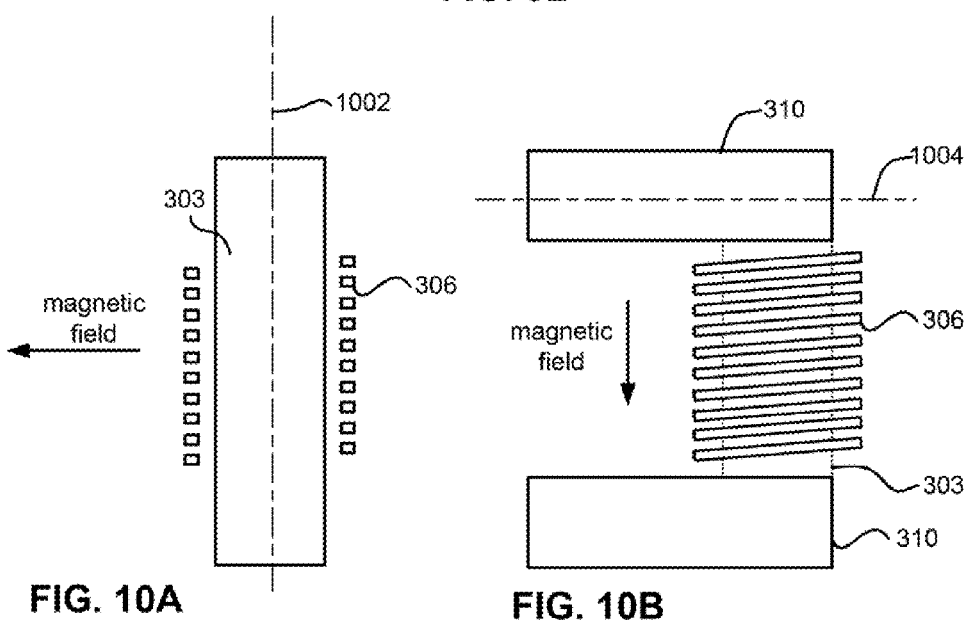
FIGS. 10A-C illustrate one method for forming a writer.
Figure 10C:
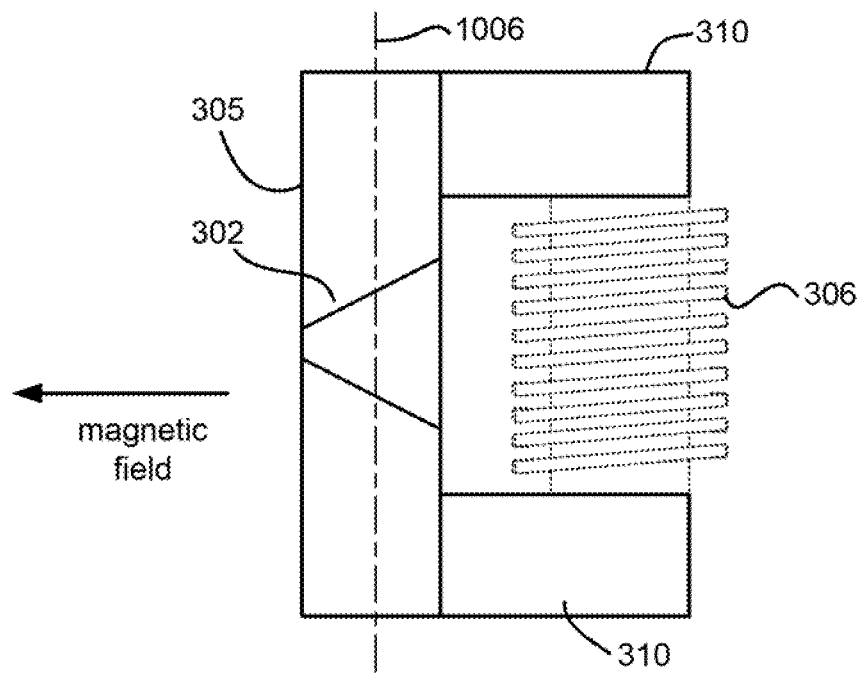

The first coil may be a helical coil or a pancake coil, the helical coil being shown in FIGS. 3 and 10B, and the pancake coil being shown in FIG. 4B. As also shown in FIG. 10C, the top pole does not overlie the first coil in some embodiments, but may overlie portions of the coil in other embodiments, e.g., one having a pancake coil.

Figure 6:
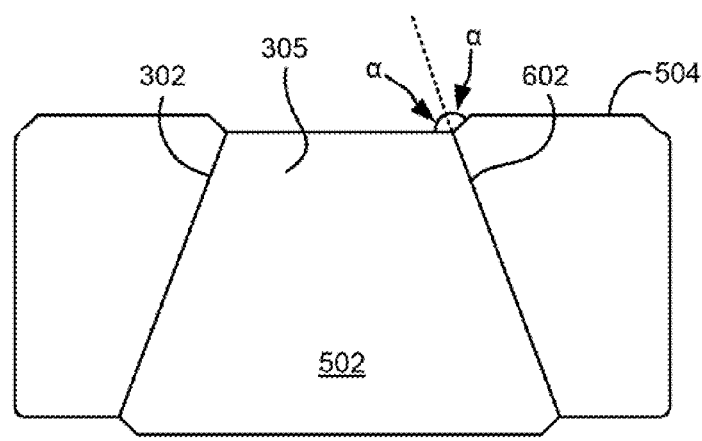
FIG. 6 is a partial tape bearing surface of a head according to one embodiment.
Figure 7:
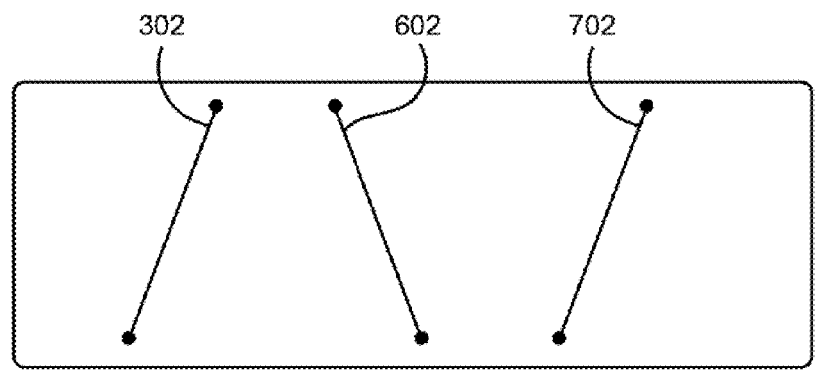
FIG. 7 is a partial tape bearing surface of a head according to one embodiment.
Figure 8:
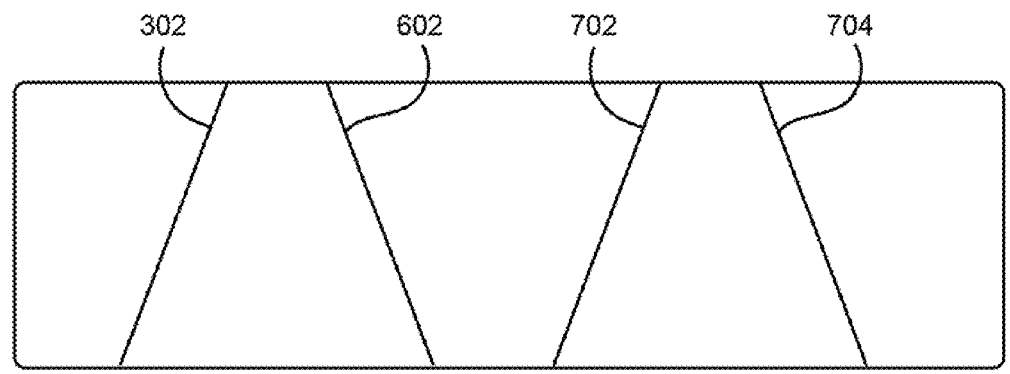
FIG. 8 is a partial tape bearing surface of a head according to one embodiment.

Multiple write gaps may be present in some embodiments. Referring to FIG. 6, a second write gap 602 may be present in the top pole, the first coil also generating a magnetic flux across the second write gap. FIG. 7 depicts an embodiment in which first, second and third write gaps 302, 602, 702 are present in the top pole, the first coil generating a magnetic flux across the first, second and third write gaps. FIG. 8 depicts an embodiment in which first, second, third and fourth write gaps 302, 602, 702, 704 are present in the top pole, the first coil generating a magnetic flux across the first, second and third write gaps.

The write gaps may be oriented at any angle relative to each other. For example, the first and second write gaps may be oriented at an angle relative to each other selected from a range of 0 degrees to less than 180 degrees.

In another illustrative approach, the first write gap is oriented at an angle of about 2 to about 90, inclusive, relative to the direction of media travel thereover, while the second write gap may also be oriented at an angle of about 2 to about 90 (which is intended to encompass between about −2 and about −90 degrees) relative to the direction of media travel thereover. While such heads may be used for any type of recording, including data recording, such heads are especially useful for writing servo patterns to a magnetic medium such as a tape.

In other embodiments, the gaps may be oriented for writing data, such as conventional or azimuthal data recording. In one approach, some of the write gaps may be oriented about parallel to each other and may be used for DC erasing tape.

As also shown in FIG. 6, wing portions 504 may be added to this and other embodiments to reduce the possibility of saturation at the ends of the gaps. Preferably, the angles α of the wing portion and central region 502 of the top pole 305 relative to an imaginary line coaxial extending along the gap are about the same.

The gaps in this or any other embodiment do not need to extend to the ends of the pole. Rather, the gaps may be positioned in the face of the top pole. Optional bulbous ends on the gaps improve the uniformity of the flux along the gap, as shown in FIG. 7.

Moreover, in some approaches, centers of the gaps may generally lie along a line oriented parallel to a direction of tape travel thereacross, e.g., are centered on the line. However, in other embodiments, the write gaps have offset centers relative to the direction of tape travel thereacross.

In some embodiments, the first and second write caps may have about a same track width. In further embodiments, the first and second write gaps have different track widths.

Note also that the gaps need not be centrally located on a given pole region. Rather, it may be desirable for asymmetric placement of a gap in some embodiments.

Several illustrative multi-gap configurations are presented in U.S. patent application Ser. No. 12/141,375 to Biskeborn et al., having title "Tandem Magnetic Writer," filed Jun. 18, 2008, and which is herein incorporated by reference.

In one embodiment, a head includes two or more independently addressable write gaps, where the gaps preferably lie along a line oriented parallel to a direction of tape travel thereacross, i.e., having at least portions thereof aligned in a direction parallel to a direction of media travel thereover. While such heads may be used for any type of recording, including data recording, the heads are especially useful for writing servo patterns to a magnetic medium such as a tape.

Figure 9A:
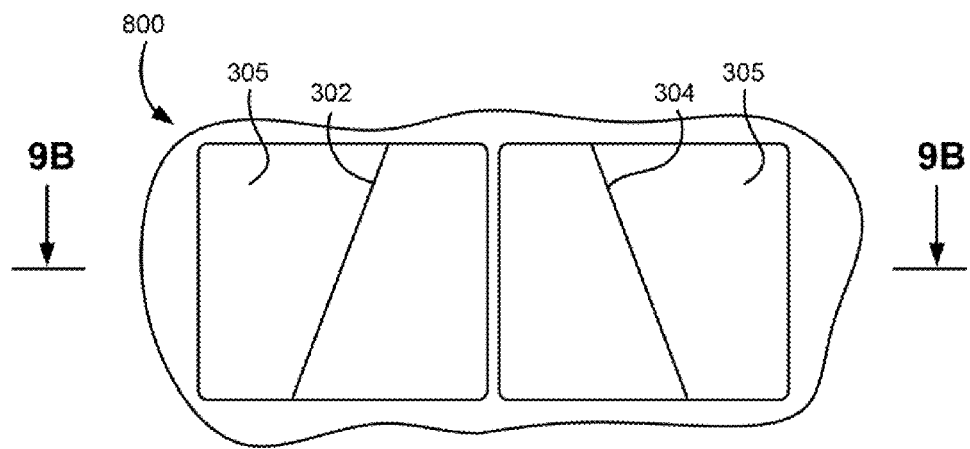
FIG. 9A is a partial tape bearing surface of a tandem head according to one embodiment.
Figure 9B:
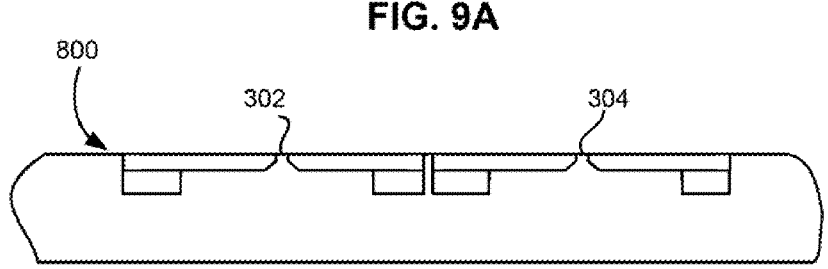
FIG. 9B is a cross sectional view of FIG. 9A taken along Line 9B-9B of FIG. 9A.

FIG. 9A illustrates a tandem head 800 according to one embodiment. FIG. 9B is a cross sectional view of FIG. 9A taken along Line 9B-9B of FIG. 9A. As shown, the tandem head has top poles 305 with first and second write gaps 302, 304 therein, and independently addressable first and second coils. The first coil is operative to cause a magnetic flux to emanate from the first gap 302. The second coil is operative to cause a magnetic flux to emanate from gap 304.

The write gaps 302, 304 in this and other embodiments may be concurrently formed. This has the advantage of allowing precise alignment of the write gaps. Also, the various regions of the pole 305 may be concurrently formed in this and other embodiments.

More information about tandem head configurations and operation is presented in U.S. patent application Ser. No. 12/141,375 to Biskeborn et al., having title "Tandem Magnetic Writer," filed Jun. 18, 2008, and which has been incorporated by reference.

Magnetic tape uses a written servo pattern to indicate tile lateral position on tape. This servo pattern is used to indicate the lateral position, on tape, of the various written tracks. The servo pattern is not perfect due to variations in tape velocity and lateral tape motion in the servo writer system during servo writing. The component of the servo pattern due to the velocity variations and lateral motion is termed the 'written in' component and interferes with capabilities of the track following actuator in the drive. For example, components of the 'written in' servo can be incorrectly interpreted by the track following actuator as lateral positioning error and so cause the head to move in response thus resulting in mistracking. Greater track following accuracy becomes more important as written tracks get narrower. Hence 'written in' servo noise limits the ultimate track pitch attainable in magnetic tape recording.

In use, some of the embodiments described herein may be used as a servo writer using methods such as those described in U.S. patent application Ser. No. 12/141,363 to Biskeborn et al., having title "Systems and Methods for Writing Servo Patterns," filed Jun. 18, 2008, and which is herein incorporated by reference.

FIGS. 10A-C illustrate one general method for forming a writer. Conventional processing may be used to form the various parts. Moreover, additional layers such as insulating layers, masks, etc. may be added and/or removed. Note that some underlying layers are shown in shadow in FIG. 10B and 10C.

Referring to FIG. 10A, a bottom pole 303 and at least portions of the first coil 306 are formed above any conventional substrate. The coil is preferably electrically isolated from the bottom pole. Preferably, a first magnetic field is applied during formation of the bottom pole. The first magnetic field is preferably oriented about perpendicular to a long axis 1002 of the bottom pole. This tends to orient the magnetic domains in the direction of the applied magnetic field, which is orthogonal to the long axis, thereby improving switching speed by causing rotation of domain magnetization rather than motion of domain walls, which is a slower process. Note that the long axis of a component lies generally along a primary path of magnetic flux as it travels through the component.

Referring to FIG. 10B, side poles 310 are formed. The coil 306 is also completed. The side poles provide the flux path between the top and bottom poles in the completed device. Preferably, a second magnetic field is applied during formation of the side poles. The second magnetic field is preferably oriented about perpendicular to a long axis 1004 of one or both side poles.

Referring to FIG. 10C, a top pole 305 is formed above a plane extending through the bottom pole and parallel to a plane of deposition of the bottom pole, where the top pole is at least partially offset from the bottom pole in a direction parallel to a plane of deposition of the top pole. Preferably, a third magnetic field is applied during formation of the top pole. The first magnetic field is preferably oriented about perpendicular to a long axis 1006 of the top pole. The longitudinal axes of the top and bottom poles are preferably oriented about parallel to each other, but need not be. Also, the longitudinal axes of the side poles are preferably not parallel to the long axis of the top pole, but could be.

As shown in FIG. 10C, at least one write gap 302 is formed in the top pole. FIGS. 11A-C and 12A-C illustrates different methods to form write gaps. Of course, any other suitable method may be used.

Figure 11A:
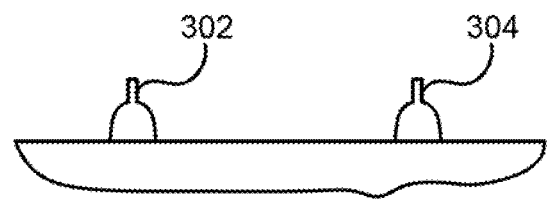
FIGS. 11A-C illustrate another method for forming a writer.
Figure 11B:
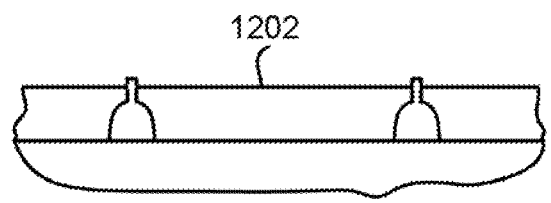
Figure 11C:
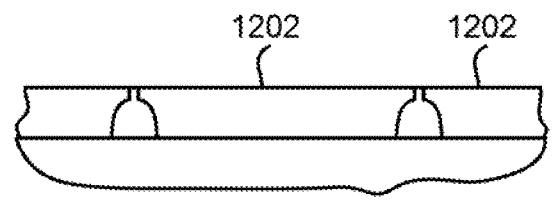

FIGS. 11A-C illustrate one method for forming a writer having independently addressable write gaps. Conventional processing may be used to form the various parts. Referring to FIG. 11A, first and second write coils 306, 308 are formed. First and second write gaps 302, 304 are also formed. Referring to FIG. 11B, material is deposited for concurrently forming write pole regions 1202, which may or may not be defined at this point. Referring to FIG. 11C, the structure is planarized.

Figure 12A:
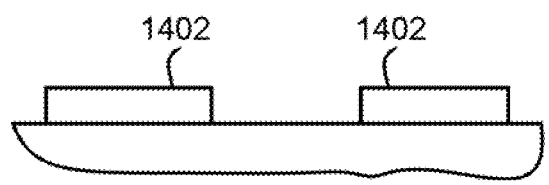
FIGS. 12A-C illustrate yet another method for forming a writer.
Figure 12B:
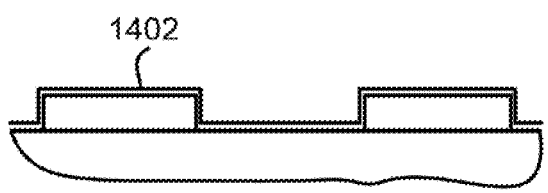
Figure 12C:
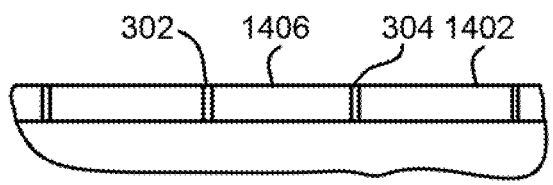

FIGS. 12A-C illustrate another method for formic, a writer. Again, processing may be used to form the various parts. Referring to FIG. 12A, first and second write coils 306, 308 are formed. Write pole regions 1402 are also formed. Write gap material 1404 is formed over the write pole regions, as shown in FIG. 12B. Further processing may be performed prior to formation of a common write pole region 1406 adjacent first and second write gaps 302, 304, as shown in FIG. 12C.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents

What is claimed is:

1. A magnetic head, comprising:
    a bottom pole;
    a top poles positioned above a plane extending between the top and bottom poles and parallel to a plane of deposition of the bottom pole, wherein the top pole has a portion that is offset from the bottom pole in a direction parallel to the plane extending between the top and bottom poles, wherein the portion of the top pole that is offset does not overlie the bottom pole;
    a first write gap in the top pole;
    a first coil for generating a magnetic flux across the first write gap.

2. A head as recited in claim 1, wherein the top pole is completely offset from the bottom pole in the direction parallel to the plane extending between the top and bottom poles such that the top pole does not overlie any portion of the bottom pole.

3. A head as recited in claim 1, wherein the first coil is a helical coil wrapped around the bottom pole, wherein the top pole does not overlie the first coil.

4. A head as recited in claim 1, further comprising a second write gap in the top pole, the first coil also generating a magnetic flux across the second write gap.

5. A head as recited in claim 4, wherein the first and second write gaps are oriented at an angle relative to each other selected from a range of 0 degrees to less than 180 degrees.

6. A head as recited in claim 4, wherein the first write gap is oriented at an angle of about 2 to about 90 relative to the direction of media travel thereover.

7. A head as recited in claim 6, wherein the second write gap is oriented at an angle of about 2 to about 90 relative to the direction of media travel thereover.

8. A head as recited in claim 1, wherein a tape bearing surface of the head is planar and has a skiving edge.

9. A head as recited in claim 1, wherein the first coil is a helical coil or a pancake coil, wherein the magnetic head is a thin film structure.

10. A head as recited in claim 1, further comprising a second write gap in a second top pole and a second coil for generating a magnetic flux across the second write gap, the second coil being addressable independently of the first coil.

11. A head as recited in claim 10, wherein the first and second write gaps are oriented at an angle relative to each other selected from a range of 0 degrees to less than 180 degrees.

12. A head as recited in claim 10, wherein the first write gap is oriented at an angle of about 2 to about 90 relative to the direction of media travel thereover.

13. A head as recited in claim 12, wherein the second write gap is oriented at an angle of about 2 to about 90 relative to the direction of media travel thereover.

14. A head as recited in claim 1, further comprising a third write gap.

15. A system having a magnetic head as recited in claim 1, the system comprising:
    a drive mechanism for passing a magnetic recording tape over the first write gap; and
    a controller in communication with the first coil.

16. A magnetic head, comprising:
    a thin film bottom pole;
    a thin film top pole being characterized as a thin film formed on a common substrate as the bottom pole, the top pole being positioned above a plane that extends through the bottom pole in an orientation parallel to a plane of deposition of the bottom pole, wherein an end of the top pole extending between top and bottom surfaces thereof and being positioned nearest the bottom pole is at least partially offset from an end of the bottom pole facing the same direction as the end of the top pole, the offset being in a direction parallel to a plane extending between the top and bottom poles;
    a first write gap in the top pole;
    a second write gap in the top pole; and
    a first coil for generating a magnetic flux across the first and second write gaps,
    wherein the first and second write gaps are oriented at an angle relative to each other selected from a range of 0 degrees to less than 180 degrees.

17. A head as recited in claim 16, wherein the top pole is completely offset from the bottom pole in the direction parallel to the plane extending between the top and bottom poles such that the top pole does not overlie any portion of the bottom pole.

18. A head as recited in claim 16, wherein the first coil is a helical coil wrapped around the bottom pole, wherein the top does not overlie the first coil.

19. A method, comprising:
    forming a bottom pole;
    forming a top pole above a plane extending through the bottom pole and parallel to a plane of deposition of the bottom pole, wherein the top pole is at least partially offset from the bottom pole in a direction parallel to a plane of deposition of the top pole, wherein at least one write gap is formed in the top pole;
    forming side poles for coupling the top and bottom poles, the forming the side poles being a separate step from the forming the top pole; and
    forming a first coil for generating a magnetic flux across the first write gap.

20. A method as recited in claim 19, wherein a first magnetic field oriented about perpendicular to a long axis of the bottom pole is applied during the forming the bottom pole, wherein a second magnetic field oriented about perpendicular to a long axis of at least one of the side poles is applied during the forming the side poles, and wherein a third magnetic field oriented about perpendicular to a long axis of the top pole is applied during the forming the top pole, wherein the longitudinal axes of the top and bottom poles are oriented about parallel to each other, wherein the longitudinal axes of the side poles are not parallel to the long axis of the top pole.

* * * * *